United States Patent
Brodt et al.

[19]

[11] Patent Number: 6,027,160
[45] Date of Patent: Feb. 22, 2000

[54] ROOF CONSTRUCTION FOR A VEHICLE

[75] Inventors: Martin Brodt, Renningen; Klaus Kleinhans, Boeblingen; Otto Rothfuss, Calw, all of Germany

[73] Assignee: Daimlerchrysler AG, Stuttgart, Germany

[21] Appl. No.: 09/170,195

[22] Filed: Oct. 13, 1998

[30]     Foreign Application Priority Data

Oct. 13, 1997 [DE] Germany ............... 197 45 126

[51] Int. Cl.[7] ............................. B26D 25/07
[52] U.S. Cl. ............................. 296/210; 296/213
[58] Field of Search ................. 296/210, 213

[56]           References Cited

U.S. PATENT DOCUMENTS

| | | | |
|---|---|---|---|
| 2,369,579 | 1/1945 | Kobligk | 296/213 |
| 4,036,522 | 7/1977 | DeRees et al. | 296/210 |
| 4,433,867 | 2/1984 | Perry et al. | 296/213 |
| 4,618,181 | 10/1986 | Tokuda et al. | 296/213 |
| 4,938,525 | 7/1990 | Yamauchi | 296/210 |
| 5,018,781 | 5/1991 | Kumasaka et al. | 296/210 |

FOREIGN PATENT DOCUMENTS

| | | |
|---|---|---|
| 0 062 506 A1 | 10/1982 | European Pat. Off. . |
| 0 126 895 B1 | 12/1984 | European Pat. Off. . |
| 0 244 073 A2 | 11/1987 | European Pat. Off. . |
| 29 12 403 C2 | 2/1987 | Germany . |
| 37 36 029 C2 | 3/1993 | Germany . |
| 38 10 268 C2 | 5/1993 | Germany . |
| 40 24 837 C2 | 1/1994 | Germany . |

*Primary Examiner*—Gary C. Hoge
*Attorney, Agent, or Firm*—Evenson McKeown Edwards & Lenahan P.L.L.C.

[57]           ABSTRACT

A roof construction for a vehicle is provided with roof panelling, side wall panellings, a roof drain between the roof panelling and the side wall panellings, and forward and rearward roof frames. Between the roof panelling and the side wall panellings, a frame-shaped interior roof part is connected with the roof panelling and the side wall panellings. The roof panelling is provided with lateral lengthening strips which cover the roof drain at least largely on the top side. In the forward and in the rearward area, the interior roof part forms portions of the forward and of the rearward roof frame.

15 Claims, 5 Drawing Sheets

ROOF CONSTRUCTION FOR A VEHICLE

BACKGROUND OF THE INVENTION

This application claims the priority of German Application No. 197 45 126.8, filed Oct. 13, 1997, the disclosure of which is expressly incorporated by reference herein.

The present invention relates to a roof construction for a vehicle, and more particularly, to a roof construction having a roof panelling, having side wall panellings, having a roof drain between the roof panelling and the side wall panellings and having a forward and a rearward roof frame.

A known vehicle roof construction provides a roof drain between a roof panel and a side panel. A welding-together of the roof panel and the side panel, and optionally also a welding to reinforcing parts takes place in or on the roof drain. A roof drain of this type replaces the formerly customary rain grooves described, for example, in DE 40 24 837 C2 and DE 38 10 268 C2.

A disadvantage of a roof drain is, however, the fact that it must have a minimum width of approximately 15 mm so that a welding can take place at this point by conventional welding electrodes. After the welding and after the assembly of the vehicle, the roof drain must be covered by a molding or the like.

DE 37 36 029 C2 describes a vehicle roof which has a U-shaped groove between a lateral roof frame and a roof skin or roof panel, in which a rubber strip which extends along the U-shaped groove is glued between the roof frame and the roof skin after the painting of the vehicle body having the two roof frames.

DE 29 12 403 C2 and EP 0 062 506 A1 also show roof constructions for motor vehicles, in which a narrowly designed roof drain is conceivable. Concerning the general state of the prior art, reference is also made to EP 0 126 895 B1.

SUMMARY OF THE INVENTION

An object of the present invention is to provide a roof construction in which, for visual and design-related reasons, a roof drain should be as narrow as possible and simultaneously a roof construction is to be provided to carry out an assembly economically.

According to the invention, this object is achieved by providing that a frame-shaped interior roof part is arranged between the roof panelling and the side wall panellings and is, in each case, connected with the roof panelling and the side wall panellings. The roof panelling covers the roof drain at least largely on the top side by means of lateral lengthening strips, and, in the forward and in the rearward area, the interior roof part forms portions of the forward and of the rearward roof frame.

The roof construction according to the present invention, particularly the frame-shaped interior roof part, reduces the width of the roof drain to a few millimeters so that only a very narrow gap remains which can be closed, for example, by the insertion of a plastic element, such as a narrow sealing strip, a weatherstrip, or the like.

Although, because of the interior roof part according to the present invention, an additional part is required which acts as an intermediate part between the roof panel and the side panel and by way of which the two parts are connected, overall, a more economical manufacturing is achieved. One of the reasons is that parts of the forward and of the rearward roof frame can simultaneously also be formed by the interior roof part according to the invention. This means that the construction for the forward and rearward roof frame required in the past may have a correspondingly simple construction.

The solution according to the present invention implements the roof frame in the desired narrow width in the body structure as well as in the assembly. Furthermore, the present invention can use the already existing intersecting points, for example, a side wall flange, and therefore causes no changes in the adjoining structural components.

By means of the interior roof part according to the present invention, a number of design alternatives are opened up, specifically:

Joining of the individual roof components with respect to the manner and succession of joining, for example, welding or gluing;

various material variants for an optimizing of weight or a hybrid solutions;

modular construction;

interesting design, for example, a glass roof; and an improvement with respect to the buckling behavior of the lateral roof frame or of the lateral roof panelling in the event of a crash.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
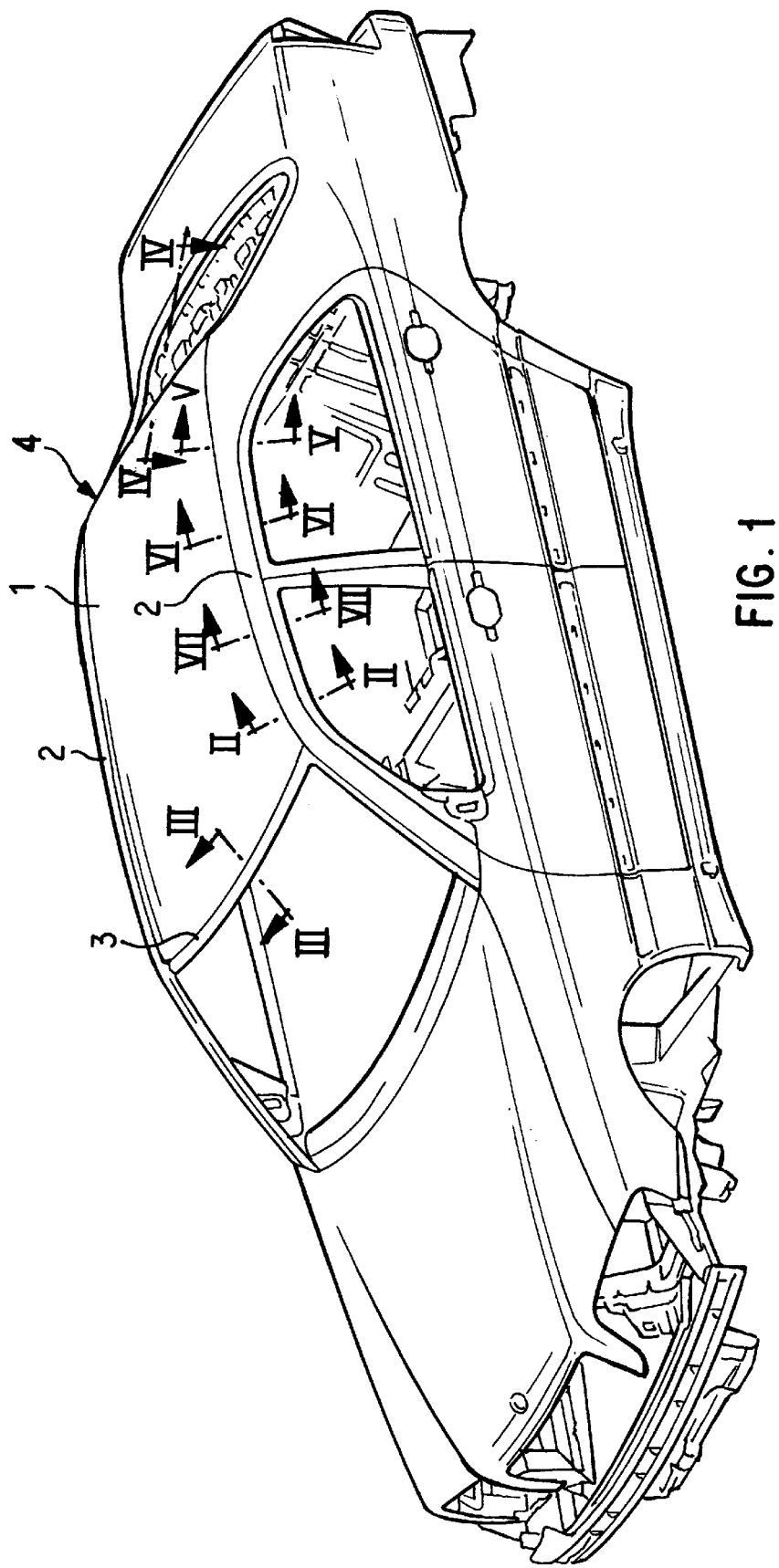
FIG. 1 is a perspective view of a vehicle body with various sectional views of details of the present invention.

The roof construction illustrated in FIG. 1 in the vehicle body has a roof panelling 1, two lateral or side wall panellings 2, a forward roof frame 3 and a rearward roof frame 4 as essential components. In addition, a frame-type interior roof part 5 is now provided as seen in the other figures.

Figure 9:
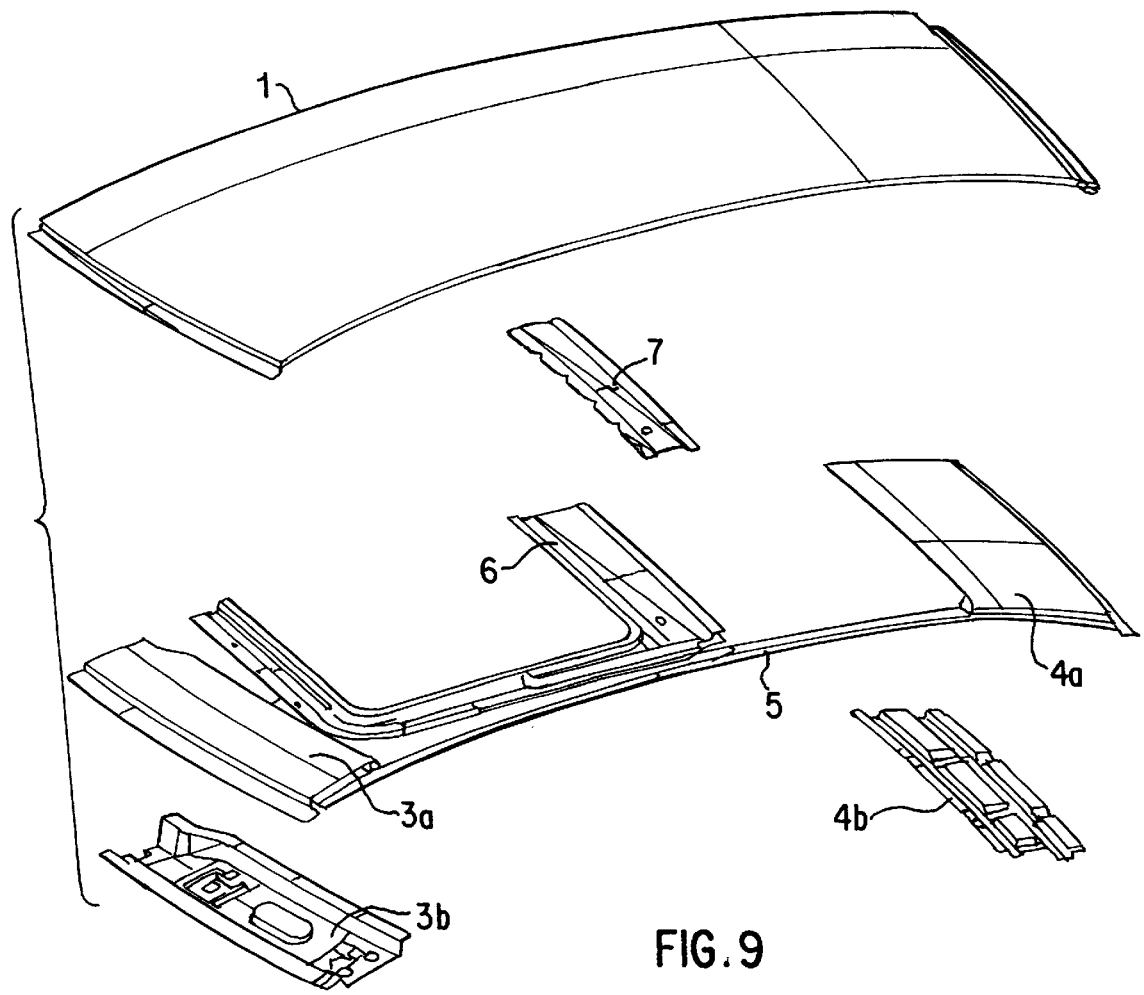
FIG. 9 is a side perspective exploded view of the roof panelling, of a cross-tie, of the interior roof part and of the forward and the rearward roof parts before their assembly.

The interior roof part 5 is illustrated in FIG. 9, in addition, a sliding roof reinforcement 6 and another cross-tie part 7 being provided. As also illustrated in FIG. 9, the frame-type interior roof part 5 is provided with a larger width in the rearward and in the forward area, whereby it forms one part respectively of the forward and of the rearward roof frame 3a, 4a. The two parts 3a, 4a are adjoined by respective profile parts 3b, 4b on their undersides and are connected therewith by, for example, welding.

The constructive further development of the roof construction will be illustrated more clearly on the basis of the following embodiments in conjunction with the component drawings of FIGS. 2 to 8.

Figure 2:
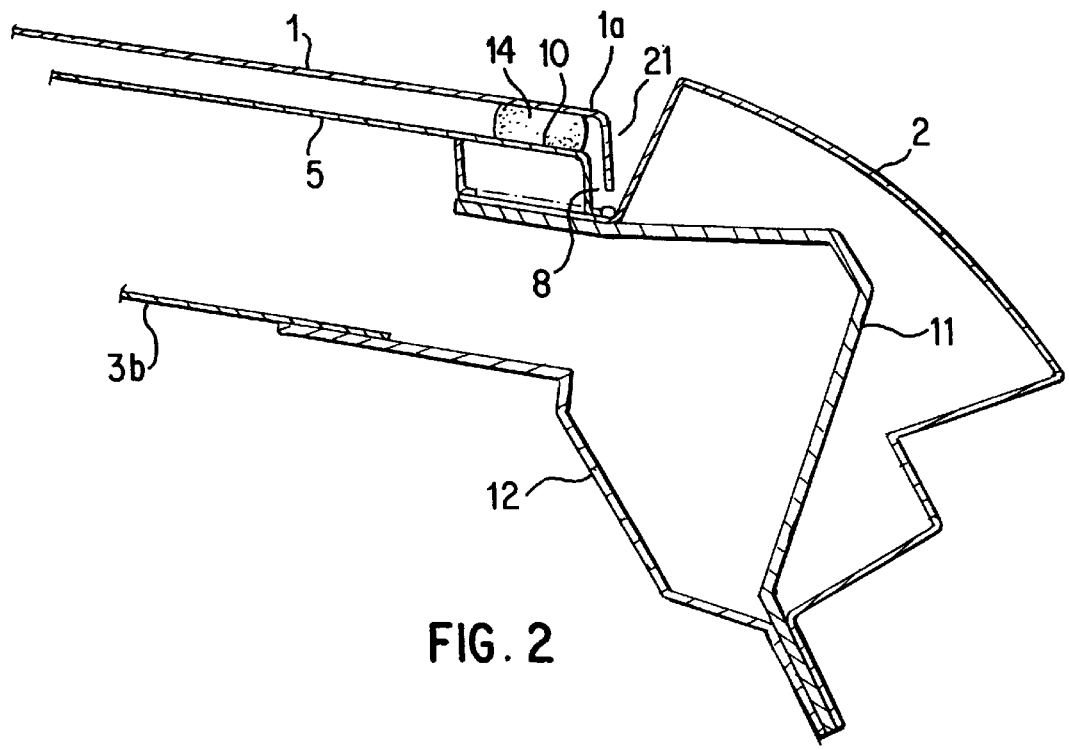
FIG. 2 is a sectional view along line II—II of FIG. 1.

In addition to the roof panelling 1 and the lateral wall panelling 2, FIG. 2 shows the roof drain 8, which is disposed in between, and the interior roof part 5. On its two longitudinal sides, the interior roof part 5 is constructed in sections in a step-shaped manner with pockets 9 (see FIG. 8) and glue application surfaces 10 in the form of steps situated in-between, which extend almost along the width of the roof drain 8. Correspondingly, a plurality of pockets 9 and step-type glue application surfaces 10 are distributed along the driving length to the forward roof frame 3 and to the rearward roof frame 4.

FIG. 2 also shows that the roof panelling 1 extends on each side in each case by way of a lengthening strip 1a on the top side, while leaving a clearance, to the lateral wall panelling 2 rounded off in the area of the roof drain 8. Furthermore, FIG. 2, which is a sectional view in the area of the A-column mode, shows a reinforcing part 11 which is provided for reinforcing the sides and may represent, for example, a portion of the A-, B- or C-column. The profile part 3b of the forward roof frame 3 is connected by way of an interior side wall 12 with the reinforcing part 11 and the side wall panelling 2, which can take place by, for example, a welding operation.

Figure 8:
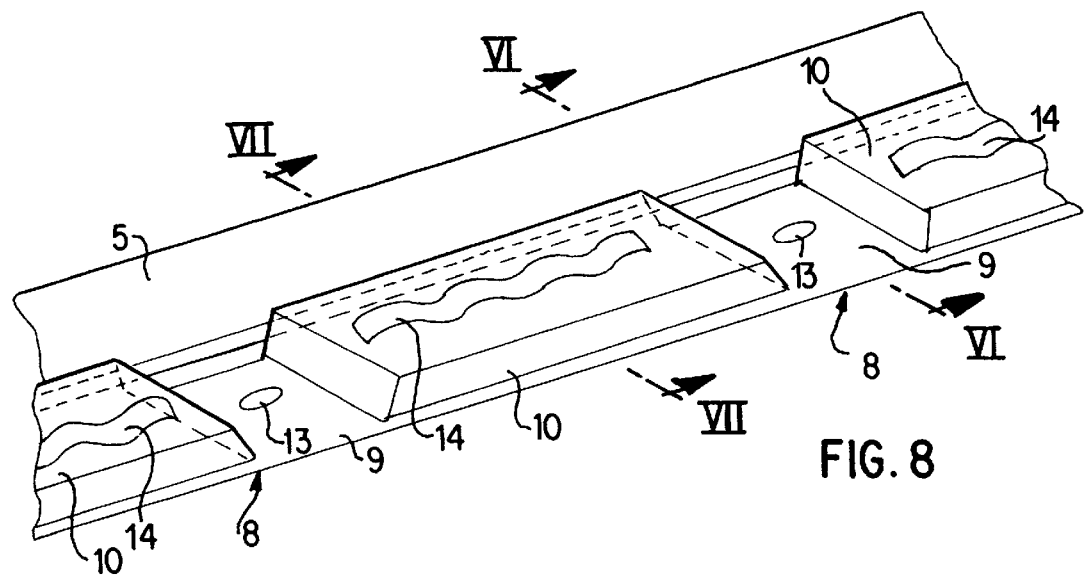
FIG. 8 is an enlarged perspective representation of a component (cutout type) of a lateral area.

The connection of the interior roof part 5 with the side wall panelling 2 and, if present, the reinforcing part 11 takes place in the roof drain 8 in each case in the area of the pockets 9 by corresponding point welds 13 as seen in FIG. 8.

The connection between the roof panelling 1 and the interior roof part 5 takes place by an adhesive layer 14 which was applied for the gluing in the form of gluing beads (see also FIG. 8) to the glue application surfaces 10. After the application of the gluing beads, the roof panelling 1 is correspondingly pressed onto the interior roof part 5, whereby the glued connection takes place.

Figure 3:
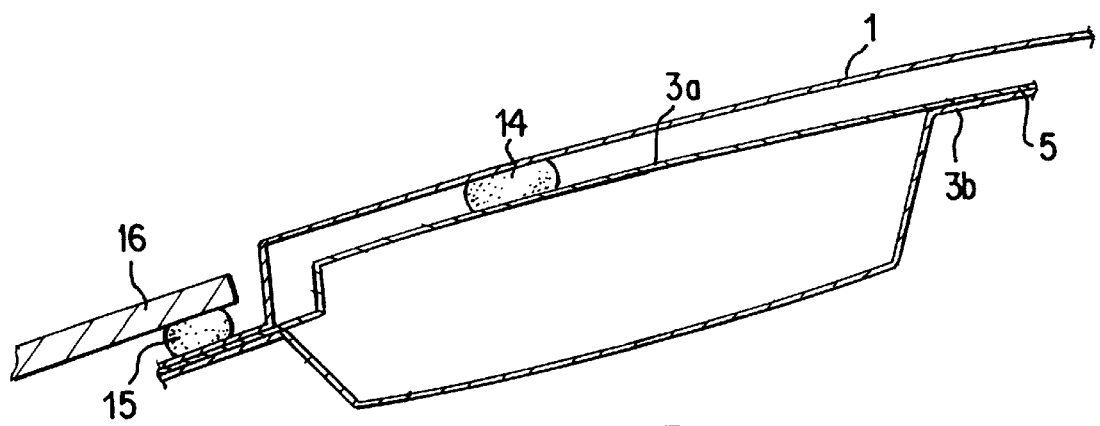
FIG. 3 is a sectional view along line III—III of FIG. 1.

FIG. 3 is a sectional view of the forward roof frame 3. The roof panelling 1 is connected by way of an adhesive layer 15 with a windshield flange 16. The individual connection between the roof panelling 1, the interior roof part 5 and the forward roof frame part 3a as part of the interior roof part 5 and the forward roof part 3b can also take place by welding or gluing.

Figure 4:
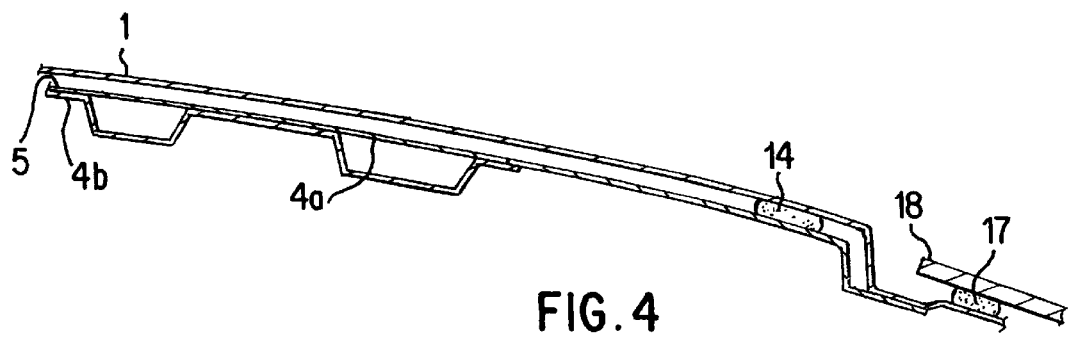
FIG. 4 is a sectional view along line IV—IV of FIG. 1.

FIG. 4 is a sectional view of the rearward roof frame 4 which, in principle, has the same construction as the forward roof frame 3. The profile part 4b, together with the roof frame 4a of the interior roof part 5, forms a roof frame 4 with two chambers. A sealing strip 17, in turn, represents the connection to a rear window 18.

Figure 5:
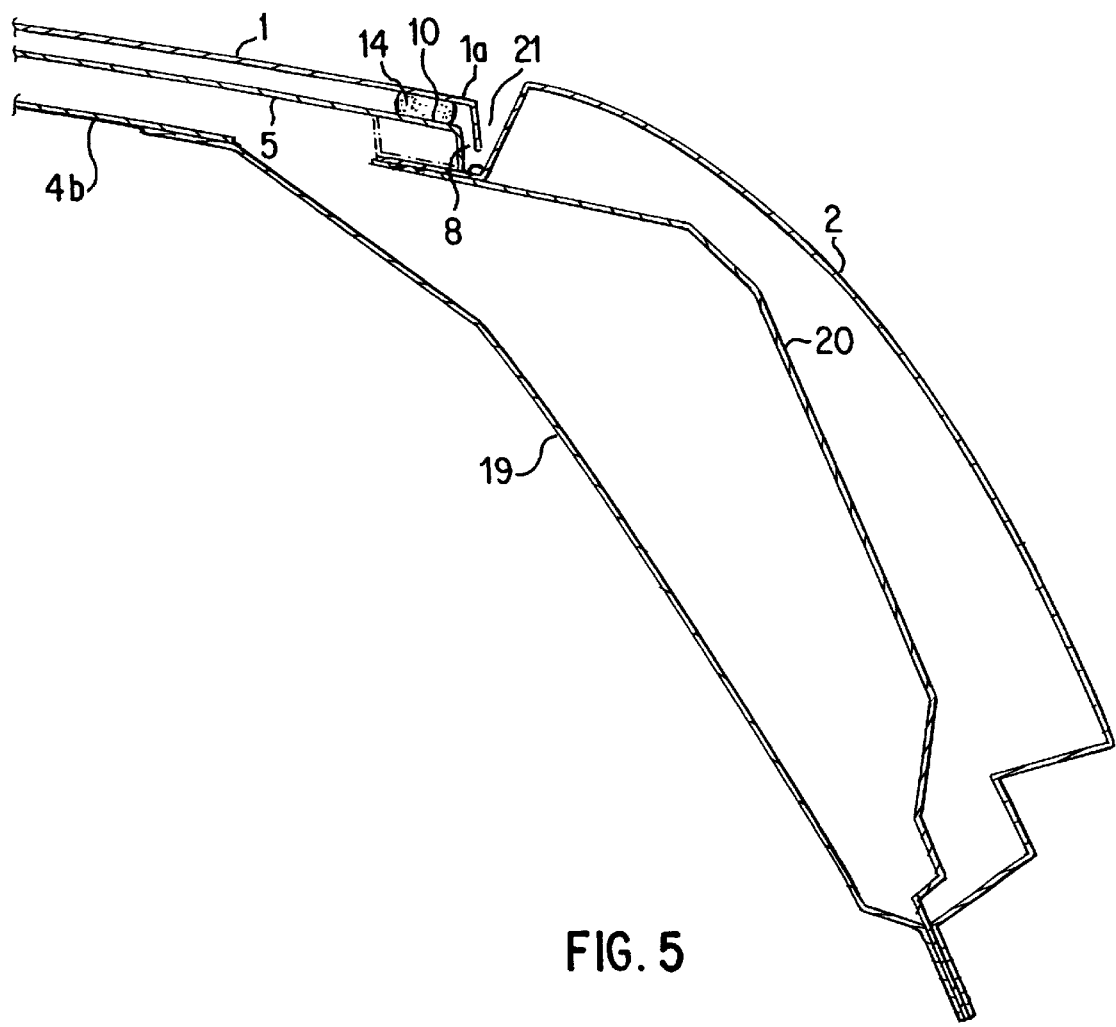
FIG. 5 is a sectional view along line V—V of FIG. 1.

FIG. 5 is a sectional view in the area of the junction point of the C-column and the roof frame in the rear. In addition, this FIG. shows the profile part 4b of the rearward roof frame 4 which, by way of an interior C-column part 19, is welded to an exterior C-column part 20 and the side wall panelling 2 at the lower end. The roof drain 8 is largely covered by the lengthening strip 1a of the roof panelling 1 so that only a narrow gap 21 remains which can be sealed after the assembly by a conventional sealing strip which need not be shown.

Figure 6:
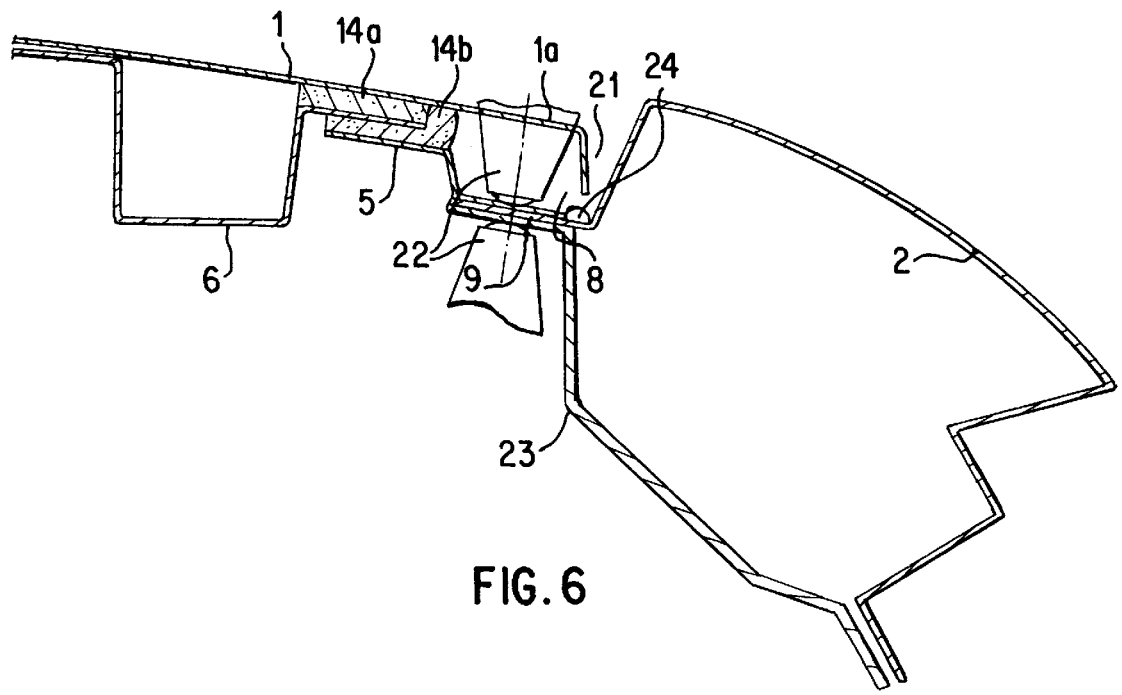
FIG. 6 is a sectional view along line VI—VI of FIG. 1 and of the enlarged detail according to FIG. 8.
Figure 7:
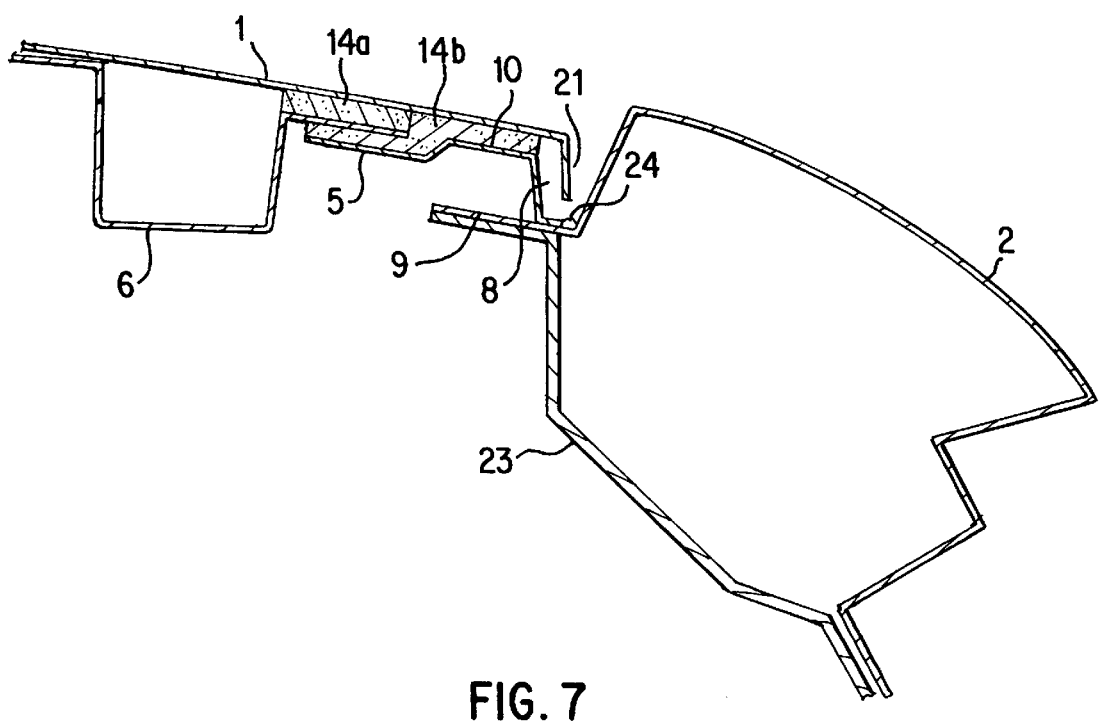
FIG. 7 is a sectional view along line VII—VII of FIG. 1 and of the enlarged component according to FIG. 8.

FIGS. 6 and 7 are similar sectional views, their concrete positions being illustrated in FIG. 8. Thus the sectional view of FIG. 6 is that of a pocket 9 which extends along the entire width of the roof drain 8 so that, by way of diagrammatically illustrated welding electrodes 22, a welded connection can be established between the side wall panelling 2 of an interior side wall as the reinforcing part and the interior roof part 5. In addition, FIG. 6 shows a sliding roof reinforcement 6 (see also FIG. 8) which is connected by way of a glued seam 14b with the interior roof part 5 and by way of a glued seam 14a with the roof panelling 1. Here also, the lengthening strip 1a almost completely covers the roof drain 8 at this point with the exception of a small gap 21.

FIG. 7 is a sectional view of the interior roof part 5 in the area of the glue application surfaces 10 which form corresponding steps in comparison to the pockets 9. The glued seam 14b extends between the interior roof part 5 and the sliding roof reinforcement 6 to cover the glue application surfaces 10. A sealing device 24 may also be provided between the interior roof part 5 and the rounding-off of the side wall panelling 2 in the lower corner of the roof drain 8.

The pockets 9 are not only used for the welded connection but also as support surfaces on the flange stack of the side wall or side wall panelling. When installing a complete roof construction, for example, by gluing or the like, on the side wall flange, an additional fixing possibility can be provided in the pockets 9 by mounting punch press nuts or rivets there.

The area of the interior roof part 5 on which the glue application surfaces 10 are situated can be used as a support surface of the roof panelling 1 and simultaneously as a support in the case of surface loads, for example, by a roof support system.

Several approaches are contemplated as a joining process for the roof construction. The individual roof components may, for example, be completely joined in the shell structure. This results in the additional advantage of a stiff vehicle body of an exact size for the overall manufacturing pass.

Alternatively, the interior roof part 5 can be joined in the shell structure, which also results in a stiff vehicle body of an exact size for the overall manufacturing pass. The roof panelling 1 is placed in the shell structure, its surface is included in the painting, and the panelling 1 is then joined during the assembly. Another alternative for a joining process of the roof construction consists of completely joining this roof construction during the assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Roof construction for a vehicle comprising roof panelling, side wall panellings, a roof drain between the roof panelling and the side wall panellings and a forward and a rearward roof frame, wherein a frame-shaped interior roof part is connected between the roof panelling and the side wall panellings, the roof panelling being configured to cover the roof drain at least substantially on a top side thereof by lateral lengthening strips, and, in forward and rearward areas, the interior roof part forming portions of the forward and of the rearward roof frame.

2. Roof construction according to claim 1, wherein the forward and the rearward roof frame are provided with reinforcing chambers by way of profile parts joined from below to the interior roof part.

3. Roof construction according to claim 1, wherein the frame-shaped interior roof part is connected with lateral reinforcing parts.

4. Roof construction according to claim 3, wherein the forward and the rearward roof frame are provided with reinforcing chambers by way of profile parts joined from below to the interior roof part.

5. Roof construction according to claim 1, wherein the frame-shaped interior roof part is stepped on longitudinal sides thereof.

6. Roof construction according to claim 5, wherein the forward and the rearward roof frame are provided with reinforcing chambers by way of profile parts joined from below to the interior roof part.

7. Roof construction according to claim 6, wherein the frame-shaped interior roof part is connected with lateral reinforcing parts.

8. Roof construction according to claim 5, wherein the interior roof part is provided with pockets constituting welding surfaces for connection with the side wall panelling and with glue application surfaces for a glued connection with the roof panelling.

9. Roof construction according to claim 1, wherein a sliding roof reinforcement of a sliding roof is operatively connected with the interior roof part.

10. Roof construction according to claim 1, wherein a gap between the roof panelling and the side wall panelling is covered by a sealing strip.

11. Roof construction according to claim 10, wherein the forward and the rearward roof frame are provided with reinforcing chambers by way of profile parts joined from below to the interior roof part.

12. Roof construction according to claim 10, wherein the frame-shaped interior roof part is connected with lateral reinforcing parts.

13. Roof construction according to claim 10, wherein the frame-shaped interior roof part is stepped on longitudinal sides thereof.

14. Roof construction according to claim 10, wherein the interior roof part is provided with pockets constituting welding surfaces for connection with the side wall panelling and with glue application surfaces for a glued connection with the roof panelling.

15. Roof construction according to claim 10, wherein a sliding roof reinforcement of a sliding roof is operatively connected with the interior roof part.

* * * * *